United States Patent Office 2,799,717
Patented July 16, 1957

2,799,717

METHOD OF ISOMERIZING TERPENES

Robert C. Palmer and Alfred F. Wicke, Jr., Pensacola, Fla., assignors, by mesne assignments, to Heyden Newport Chemical Corporation, New York, N. Y., a corporation of Delaware No Drawing. Application May 14, 1953, Serial No. 355,183

7 Claims. (Cl. 260—675.5)

This invention relates to a method of isomerizing terpenes, and more particularly alpha pinene by the use of sulfuric acid as the isomerization catalyst.

With a view to obtaining a mixture of menthadienes by an economical method, we have devised such as method starting with alpha pinene. The source of the alpha pinene may be any commercial type of turpentine, such as steam distilled wood turpentine, gum turpentine, or sulfate turpentine, all of which contain at least 60% of alpha pinene. We have found that by proper control of the concentration of sulfuric acid used as the catalyst, and also of the temperature at which the catalytic reaction is carried out, the alpha pinene can be isomerized into a mixture of menthadienes containing no dipentene and with a minimum formation of polymers. The variables as to concentration of sulfuric acid and temperature may also be controlled so as to obtain a minimum formation of cineol, or if cineol is not objectionable, the variables can be so controlled as to obtain a high kauri-butanol value and also a corresponding high cineol content. The isomers that are formed by our method are principally alpha and gamma terpinene and iso-terpinoline.

It is, therefore, an important object of this invention to provide a relatively economical method of preparing mixed menthadienes substantially free of dipentene from alpha pinene as a starting material, either by itself or as present in commercial types of turpentine.

It is a further important object of this invention to provide a method of isomerizing alpha pinene by the use of sulfuric acid as the isomerization catalyst and so controlling the conditions of the catalytic reaction as to obtain mixed menthadienes containing no dipentene and substantially free from polymer content at the end of the isomerization step and, optionally, either high or low in cineol content.

Further important objects of this invention will become apparent from the following description and appended claims.

As already stated the starting material may be alpha pinene in a technically pure state, or as present in commerical types of turpentine. The alpha pinene starting material, thus, may contain other bi-cyclic terpenes, as beta pinene.

Our method involves mixing together alpha pinene and sulfuric acid of the proper concentration and maintaining extended surface contact between the alpha pinene and the sulfuric acid throughout the time of the catalytic reaction. Such extended contact is suitably obtained by violent agitation of the mixture of pinene and acid, as by means of a mechanical agitator. Since the reaction is exothermic it is not always necessary to supply heat once the reaction has started, but means should be provided for maintaining the temperature within fairly close limits. For this purpose, cooling coils may be required during part of the reaction where carried out on a large scale. The time required, in general, is at least 7 hours, but may be considerably longer depending upon temperatures and concentrations of the sulfuric acid.

At the completion of the reaction, the sulfuric acid is separated by gravity, the crude oil from the reaction mass is washed with dilute caustic alkali solution and then steam distilled. The steam distillate is fractionated in order to separate unreacted pinene or to determine the proportion of unreacted pinene. The unreacted pinene may be recycled.

One of the variables in the method is the pinene-to-acid ratio. Although the action of the sulfuric acid is catalytic and therefore no sulfuric acid is consumed in the reaction, itself, it is important to determine the ratio of pinene to sulfuric acid for a given piece of equipment that will give the optimum contact between the pinene and the acid with a minimum proportion of acid. Runs were made, therefore, using varying volume ratios of pinene to acid, holding other variables substantially constant, until it was determined what were the most favorable ratios of pinene to acid to obtain a sufficiently good contact so as not to require an unnecessarily long time of agitation to complete the reaction. From these experiments it was determined that the optimum ratio of pinene to sulfuric acid by volume was 100:35, but that the range could be varied with satisfactory results from a ratio of 1:1 to a ratio of 1:0.2 or even lower. These ratios are not critical in the sense of being necessary in order to carry out the isomerization of the alpha pinene with satisfactory yields, but the limiting ratios are nevertheless important where it is desired to use a minimum amount of sulfuric acid in proportion to the volume of alpha pinene and still carry out the isomerization within a reasonable period of time.

With respect to the acid strength, runs were made to determine the permissible variations in the concentration of sulfuric acid used as the isomerization catalyst. As the result of these runs, it was found that the optimum concentration of the aqueous sulfuric acid solution was from 51 to 52.5% by weight but that the concentration could be varied between the wider limits of 45 to 55% by weight. There is a direct correlation between acid strength and acid temperature which will be referred to again later on, but in general the higher the concentration of acid within the limits of 45–55% by weight for the higher temperatures within the limits of 35 to 65° C. the lower the proportion of cineol content in the reaction mass. Also, if a higher acid concentration than about 55% by weight is used, such as 60% acid, the temperature rises too fast, there is danger of sulfonation taking place, and polymers are formed up to as much as 60% by weight of the reaction mass.

In the table to be given later, all figures for acid strength at the start of the isomerization reaction are titration values. The strength of the acid varies very little during the reaction. In the table given below the same acid was used for all runs, but was modified as required by the addition of water or concentrated acid to bring its strength to the point desired.

The effect of the reaction temperature was also determined by the series of runs shown in the accompanying table. It was found that upon the initial mixing of the alpha pinene and sulfuric acid the temperature rose because of the exothermic nature of the reaction and reached a maximum within 2 to 3 hours from the start, after which the temperature would drop toward room temperature if no precautions were taken to prevent the dropping in temperature. We found that the optimum temperature was about 55° C. or within the relatively narrow range of from 50 to 55° C. When the temperature was held within this range, using added heat, if necessary, a smaller proportion of unreacted pinene was left at the end of the reaction and a lower proportion of cineol was formed. It was also found that by controlling the temperature, the cineol content could be controlled within suitable limits. At a temperature of 37.5° C., a high cineol content, over about 15%, was obtained, while at a temperature of 55° C., the cineol content was generally less than 10%. The cineol content directly influences the kauri-butanol value, the higher the cineol, the higher the kauri-butanol value. It was found possible to so control the acid concentration and temperature as to obtain higher and lower kauri-butanol values, as desired. In order to assure a kauri-butanol value in the range of commercial dipentene, the temperature should be kept between 50–55° C. and the acid concentration within the range of 51 to 52% by weight.

For convenience in the runs that were made to determine the effect of the variables of pinene-to-acid ratio, acid strength and temperature, the reaction time was fixed at 7 hours. When the ratio of pinene to acid was changed from 1:0.5 to 1:0.35, keeping those variables constant, the unreacted alpha pinene increased from 10–15% to 15–20%. When the time was lengthened to 9 hours under the same conditions, the unreacted pinene dropped to 10%. In general, however, the length of the reaction time will also depend upon the type of equipment and particularly upon the efficiency of the agitation provided for aiding the reaction.

The following will serve to illustrate a preferred embodiment of our invention:

EXAMPLE 100 parts by volume of alpha pinene were added to 35 parts by volume of an aqueous sulfuric acid solution of 51 to 52.5% concentration of $H_2SO_4$ by weight. The mixture was vigorously agitated, and agitation continued throughout the entire period of the run, which lasted 9 hours. The temperature was allowed to rise to 50–55° C., and held within that range until the end of the run. Samples of the reaction mass were withdrawn from time to time, and tested for index of refraction and also for specific gravity. The run was continued until the index of refraction ($RI_D^{20°}$ C.) reached at least 1.483. At this point, the specific gravity was between 0.867 and 0.8700.

As a further check upon the completion of the reaction, a sample of the reaction mass was withdrawn and steam distilled to obtain a steam distillate, which was then subjected to Engler distillation. When the Engler distillation showed not more than 5% had distilled at temperatures up to 175–176° C. this indicated substantially complete conversion of a pinene starting material into monocyclic hydrocarbons.

At the completion of the run the unreacted mass was allowed to settle and the heavier density sulfuric acid solution was drawn off for re-use, while the crude oils were separated and washed with enough caustic alkali solution to neutralize any remaining suspended acid. The crude oils were then steam distilled in the presence of some caustic alkali added to the still to insure neutralizing any sulfonation by-products that might be formed. The unreacted pinene was fractionated out, but it could be left in if it does not exceed 10% by weight of the final product, or it can be recycled.

Since the cineol content of the mixed menthadienes obtained by our process is of interest, a test for determining the amount of cineol content was developed. 100 grams of the oil to be tested is refluxed with 30 ml. of mineral spirits and 3 grams of fuller's earth. The volume of water produced multiplied by 154 and the product divided by 18 equals the percent of cineol. The cineol content should be at least 6% in order to give a kauri-butanol to equal about that of commercial dipentene. The particular cineol produced in the method herein described is 1–8 cineol.

The composition of the mixed menthadienes recovered as steam distilled oils and with reference only to the monocyclic hydrocarbon content, as produced in accordance with our preferred method as above given is substantially:

Percent by weight
Alpha terpinene _____ 50–60
Gamma terpinene _____ 25–35
Iso-terpinoline _____ 15 approx.

No dipentene has ever been found in our product. Our composition of mixed menthadienes within the ranges of percentages by weight just given finds particular utility as the starting material in the process of manufacturing menthol from a source of pinene, such as turpentine and is described for that purpose in the copending application of McLaughlin, Stump and Cleere, Serial No. 354,943, filed May 14, 1953, and assigned to the same assignee as the present invention. In the process of said copending application, the mixed menthadienes produced in accordance with our process are hydrogenated to yield menthenes; the menthenes are oxidized by performic or peracidic acid to yield menthone; and the menthone hydrogenated to menthol. Our process thus makes available from a cheap and plentiful raw material, turpentine, a composition of mixed menthadienes useful in the making of menthol.

The following table shows the results of a number of runs made in accordance with our method:

*Isomerization of alpha pinene with sulfuric acid*

| Run | Time, Hrs. | Percent $H_2SO_4$ Start | Highest temp. during run | Volume ratio Pinene to Acid | Crude Oils | | Steam Distilled Oils | | | | | | | |
|---|---|---|---|---|---|---|---|---|---|---|---|---|---|---|
| | | | | | Sp. Gr., 15/4°C. | $RI_D^{20}$ | Engler Distillation | | Sp. Gr., 15/4°C. | $RI_D^{20}$ | Cineol Content, 1–8 | Kauri butanol Value | Percent Recovery by Volume | Polymer by Weight | Estimated unreacted Alpha Pinene, Percent |
| | | | | | | | 5% | 95% | | | | | | | |
| 1 | 8 | 48.46 | 43.5 | 1:1 | | | 171 | 184.5 | 0.8661 | 1.4727 | 16.3 | | 92.7 | | |
| 2 | 4 | 60.58 | 63 | 1:1 | | | | | | | | | | (¹) | |
| 3 | 7 | 51.44 | 50 | 1:1 | | | 177 | 186 | 0.8577 | 1.4799 | 8.5 | 63 | 91.0 | 9.6 | 5 |
| 4 | 7 | 51.11 | 37.5 | 1:1 | | 1.4780 | 178 | 186 | 0.8622 | 1.4775 | 16.3 | 77 | 93.0 | 7.8 | 5 to 7 |
| 5 | 7 | 51.33 | 56 | 1:1 | | | 178 | 186.5 | 0.8564 | 1.4816 | 8.1 | 63.5 | 89.2 | 9.9 | |
| 6 | 7 | 51.45 | 53.5 | 1:0.75 | | | 176 | 186.5 | 0.8580 | 1.4795 | 8.6 | 64.5 | 92.8 | 8.6 | 10 |
| 7 | 7 | 51.31 | 49 | 1:0.50 | 0.8706 | 1.4786 | 172 | 185.0 | 0.8613 | 1.4767 | 12.0 | 66.5 | 93.0 | 7.8 | 20–25 |
| 8 | 7 | 51.84 | 63 | 1:0.50 | 0.8684 | 1.4834 | 175 | 186.0 | 0.8580 | 1.4804 | 8.1 | 63.5 | 91.5 | 9.3 | 10–15 |
| 9 | 7 | 52.18 | 60 | 1:0.35 | 0.8681 | 1.4817 | 173.5 | 186.0 | 0.8596 | 1.4793 | 6.9 | 62.0 | 93.0 | 7.5 | 15–20 |
| 10 | 8 | 52.03 | 55 | 1:0.20 | 0.8682 | 1.4783 | 170 | 185.0 | 0.8607 | 1.4761 | 7.7 | 61.7 | 93.0 | 7.5 | 30–35 |
| 11 | 11 | 52.28 | 56 | 1:0.20 | 0.8673 | 1.4825 | 175 | 186.0 | 0.8581 | 1.4799 | 6.8 | | 91.0 | 9.8 | 15–20 |
| 12 | 7 | 54.18 | 55 | 1:0.35 | 0.8711 | 1.4858 | 176 | 186.0 | 0.8567 | 1.4816 | 5.6 | 61.0 | 86.3 | 14.5 | 10 |
| 13 | 9 | 51.64 | 53 | 1:0.35 | 0.8688 | 1.4839 | 176 | 187.0 | 0.8570 | 1.4803 | 5.6 | 65 | 91.0 | 10.5 | 10 |
| 14 | 9 | 47.94 | 55 | 1:0.35 | 0.8687 | 1.4781 | 173 | 186.5 | 0.8626 | 1.4767 | 16.3 | 69.0 | 96.0 | 8.1 | 25–30 |

¹ 60% or more.

In the foregoing table, run No. 1, using 60.58% $H_2SO_4$ and a temperature of 63° C. showed rather bad sulfonation, in addition to forming a very large proportion of polymer. Even with 52.5% $H_2SO_4$ concentration there is a tendency toward sulfonation at temperatures above 55° C.

Run No. 3, due to the lower temperature used, 37.5° C., showed a relatively large formation of cineol. Run No. 5 also showed high cineol, probably due to the temperature, 49° C., being somewhat low, while run No. 12 showed high cineol because of low concentration of sulfuric acid, 48%, even though the temperature was held at 55° C.

We claim as our invention:

1. The method of isomerizing alpha pinene to mixed menthadienes free of dipentene which comprises vigorously mixing together alpha pinene and sulfuric acid, the sulfuric acid having a concentration of $H_2SO_4$ by weight of between 45 and 55% and the temperature of the mass being kept between 35 and 65° C. and continuing the mixing until the specific gravity of the resulting crude oil is between 0.867 and 0.870 and the index of refraction is at least 1.483 and stopping the reaction when said specific gravity and index of refraction values have been reached in order to avoid the formation of substantial amounts of polymers.

2. The method of isomerizing alpha pinene to mixed menthadienes free of dipentene which comprises vigorously mixing together alpha pinene and sulfuric acid, the sulfuric acid having a concentration of between 51 and 52.5% $H_2SO_4$ by weight and the temperature of the mass being at about 55° C. and continuing the mixing until the specific gravity of the resulting crude oil is between 0.867 and 0.870 and the index of refraction is at least 1.483 and stopping the reaction when said specific gravity and index of refraction values have been reached in order to avoid the formation of substantial amounts of polymers.

3. In the method of isomerizing alpha pinene by means of sulfuric acid to form mixed menthadienes containing no dipentene, the improvement whereby the formation of polymer is reduced, which comprises vigorously mixing and agitating together alpha pinene and an aqueous solution of sulfuric acid of 51 to 52.5% $H_2SO_4$ by weight, maintaining the resulting mass at a temperature of about 50 to 55° C. while continuing the mixing and agitating until a sample of crude oil separated from the mass exhibits a specific gravity of between 0.867 and 0.870 and an index of refraction of not less than 1.483, stopping the mixing and agitating when said specific gravity and index of refraction values have been reached and recovering from said mass a menthadiene mixture containing no dipentene and substantially free of any polymer.

4. In the method of isomerizing alpha pinene by means of sulfuric acid, the improvement whereby the formation of polymer is reduced, which comprises vigorously mixing and agitating together alpha pinene and an aqueous solution of sulfuric acid of 51 to 52.5% $H_2SO_4$ by weight, the volume proportions being held between 1 to 1 and 1 to 0.2 of pinene to sulfuric acid solution, maintaining the resulting mass at a temperature of about 50 to 55° C. whereby the formation of polymer is minimized, continuing the mixing and agitating until a sample of crude oil separated from the mass exhibits a specific gravity of between 0.867 and 0.870 and an index of refraction of not less than 1.483, stopping said mixing and agitating when said specific gravity and index of refraction values have been reached and steam distilling to recover from said mass a menthadiene mixture substantially free of dipentene.

5. In the method of isomerizing alpha pinene by means of sulfuric acid as the isomerization catalyst, the improvement whereby the formation of polymer is reduced, which comprises mixing together with violent agitation alpha pinene and an aqueous sulfuric acid solution of 51 to 52.5% $H_2SO_4$ by weight, maintaining the resulting mass throughout at a temperature of between 50 and 55° C. whereby the formation of polymer is minimized, continuing mixing at that temperature until a sample of crude oil separated from the mass has an index of refraction of not less than 1.483 and said sample upon being steam distilled gives an Engler distillation of not over 5% by weight at temperatures up to 175-176° C., discontinuing mixing at that point and distilling said mass in the presence of alkali to recover a dipentene-free and a substantially polymer-free menthadiene mixture, the menthadienes consisting essentially of alpha and gamma terpinenes and isoterpinoline.

6. The method of isomerizing alpha pinene to mixed menthadienes free of dipentene which comprises vigorously agitating a mixture of alpha pinene and an aqueous sulfuric acid solution of between 45 and 55% by weight $H_2SO_4$, at a temperature between 35 and 65° C., controlling the concentration of sulfuric acid and the temperature between the limits aforesaid and adjusting the time of such agitation so as to obtain a mass having a specific gravity of between 0.867 and 0.870 and an index of refraction at 20° C. of at least 1.483, stopping the agitation and mixing at a point at which a sample of said mixture after being steam distilled and subjected to an Engler distillation shows not over 5% by weight distilling at temperatures up to 175-176° C., and recovering from said mixture a menthadiene mixture containing no dipentene and substantially free of any polymer.

7. Mixed menthadienes consisting essentially of from 50 to 60% of alpha terpinene, from 25 to 35% of gamma terpinene and about 15% of isoterpinoline.

References Cited in the file of this patent
UNITED STATES PATENTS 2,097,743     Sheffield     Nov. 2, 1937

OTHER REFERENCES

Dupont et al.: Bull. Soc. Chim. de France, vol. 51, part 2 (memoires), 1932, pp. 1579–1594; pp. 1579–81 and 1594 used.

Charlton et al.: Ind. Eng. Chem., vol. 29, pages 92–95 (1937).

Peleato: Trabajos lab. bioquim. y quim. aplicada, Inst. "Alonso Barba," Univ. Zaragoza, Facultad Cienc., Ser. II, 2/3, 343–5 (1941). Abstracted in Chem. Abs., vol. 48, page 188f (1949).